(12) United States Patent
Umstead et al.

(10) Patent No.: US 12,521,310 B2
(45) Date of Patent: Jan. 13, 2026

(54) COAXIAL NEEDLE ADAPTER AND GUIDE BRACKET FOR ROBOTIC LIQUID HANDLING PLATFORM

(71) Applicant: AMGEN INC., Thousand Oaks, CA (US)

(72) Inventors: Russell Blake Umstead, Thousand Oaks, CA (US); Michael A. Johnson, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 105 days.

(21) Appl. No.: 18/275,520

(22) PCT Filed: Feb. 1, 2022

(86) PCT No.: PCT/US2022/014652
§ 371 (c)(1),
(2) Date: Aug. 2, 2023

(87) PCT Pub. No.: WO2022/169724
PCT Pub. Date: Aug. 11, 2022

(65) Prior Publication Data
US 2024/0082110 A1 Mar. 14, 2024

Related U.S. Application Data

(60) Provisional application No. 63/145,214, filed on Feb. 3, 2021.

(51) Int. Cl.
*A61J 1/20* (2006.01)
*B01J 19/00* (2006.01)

(52) U.S. Cl.
CPC ............. *A61J 1/201* (2015.05); *A61J 1/2068* (2015.05); *B01J 19/0046* (2013.01);
(Continued)

(58) Field of Classification Search
CPC .......... A61J 1/201; A61J 1/2068; A61J 3/002; A61J 1/20; B01J 19/0046;
(Continued)

(56) References Cited

U.S. PATENT DOCUMENTS 5,400,666 A * 3/1995 Song ................... G01N 35/1079
73/864.21
5,431,201 A * 7/1995 Torchia ................... B65B 3/003
901/6

(Continued)

FOREIGN PATENT DOCUMENTS

EP 1467205 A1 10/2004
WO WO-2018/175926 A1 9/2018

OTHER PUBLICATIONS

International Search Report for Application No. PCT/US2022/014652 dated May 16, 2022.
(Continued)

*Primary Examiner* — Kenneth Rinehart
*Assistant Examiner* — Stephanie A Shrieves
(74) *Attorney, Agent, or Firm* — MARSHALL, GERSTEIN & BORUN LLP; Michael P. Furmanek (57) ABSTRACT

A drug reconstitution system includes a robotic arm movable between a plurality of positions, at least one bracket member operably coupled with the robotic arm, and at least one coaxial needle operably coupled with the robotic arm. The at least one bracket member includes a mounting region, a support surface, an upper surface, and a throughbore extending through the support surface and the upper surface. The at least one coaxial needle is movably disposed between the throughbore of the at least one bracket member. The at least one coaxial needle is adapted to pierce at least a portion of a vial and dispense a liquid into the vial during drug reconstitution.

15 Claims, 6 Drawing Sheets

(52) U.S. Cl.
CPC ............... *B01J 2219/00011* (2013.01); *B01J 2219/00373* (2013.01); *B01J 2219/00691* (2013.01)

(58) Field of Classification Search
CPC .... B01J 2219/00011; B01J 2219/00373; B01J 2219/00691
USPC ................................................................ 141/1
See application file for complete search history.

(56) References Cited

U.S. PATENT DOCUMENTS

| | | | | |
|---|---|---|---|---|
| 5,814,742 | A * | 9/1998 | Vissers | G01N 30/24 73/864.83 |
| 5,935,523 | A * | 8/1999 | McCandless | G01N 35/1079 141/330 |
| 5,945,070 | A * | 8/1999 | Kath | B01J 19/0046 422/537 |
| 6,240,984 | B1 * | 6/2001 | Fawcett | G01N 1/405 141/130 |
| 6,257,076 | B1 * | 7/2001 | Snyder | G01N 30/18 73/864.87 |
| 6,360,794 | B1 * | 3/2002 | Turner | G01N 35/1079 141/130 |
| 6,605,257 | B1 * | 8/2003 | Nakazawa | B01J 19/0046 73/864.18 |
| 7,549,978 | B2 * | 6/2009 | Carlson | G01N 35/028 422/534 |
| 7,900,658 | B2 * | 3/2011 | Osborne | B01F 35/422 604/407 |
| 8,679,421 | B2 * | 3/2014 | Sano | G01N 35/10 422/511 |
| 9,687,841 | B2 * | 6/2017 | Hofmann | B01L 3/0293 |
| 2003/0116497 | A1 | 6/2003 | Carlson et al. | |
| 2004/0154690 | A1 * | 8/2004 | Osborne | B65B 7/2821 141/27 |
| 2006/0216208 | A1 * | 9/2006 | Li | G01N 35/1079 422/561 |

OTHER PUBLICATIONS

Written Opinion for Application No. PCT/US2022/014652 dated May 16, 2022.

* cited by examiner

COAXIAL NEEDLE ADAPTER AND GUIDE BRACKET FOR ROBOTIC LIQUID HANDLING PLATFORM

CROSS-REFERENCE TO RELATED APPLICATION

This is the United States national phase of International Patent Application No. PCT/US2022/014652, filed Feb. 1, 2022, which claims priority to U.S. Provisional Patent Application No. 63/145,214, filed Feb. 3, 2021, the entire contents of each of which are hereby expressly incorporated herein by reference.

FIELD OF DISCLOSURE

The present disclosure generally relates to drug delivery systems, and, more particularly, to robotic based reconstitution approaches for drug delivery systems.

BACKGROUND

Drugs are administered to treat a variety of conditions and diseases. These drug dosings may be performed in a healthcare facility, or in some instances, at remote locations such as a patient's home. In certain applications, a drug product may be shipped to a healthcare facility (e.g., an inpatient facility, an outpatient facility, and/or a pharmacy) in a powdered or lyophilized form or alternatively in a liquid form.

When reconstituting these drugs for administration, it is desirable to maintain a clean and/or sterile environment so as to not taint or otherwise damage the quality of the drug or otherwise impact development. Additionally, some classes of drugs such as bi-specific T-cell engagers may require exceptionally accurate quantities of the drug product and/or other fluids required for dosing. Oftentimes, the healthcare professional must prepare the drug by closely following a set of steps to ensure a sterile environment is maintained and that correct quantities of ingredients are added to the delivery container. As a result, the reconstitution process may be time-consuming, tedious, and may have an unacceptable or undesirable error rate. Development of robotic based analytical workflows for lyophilized drug products has resulted in a reduction of time and labor intensive sample preparation tasks in addition to the mitigation of safety concerns such as exposure to needles during drug reconstitution. These new workflows may reconstitute lyophilized samples autonomously or semi-autonomously, extract the samples from sealed containers, and/or perform sample preparation steps such as dispensing samples into a microwell plate for measuring protein concentrations, each with minimal or no manual intervention.

In some existing approaches, a needle assembly may be provided that includes a piercing needle and a separate venting needle. Due in part to the thickness of the seal of the drug product vial, such an arrangement could result in one or both of the piercing and venting needles becoming damaged or otherwise broken during insertion. Further, in these systems, one or both of the needles could become stuck in the seal, and as a result, upon raising the needle assembly, the seal and/or the drug product vial may remain coupled with the needle or needles, causing the drug product vial to be lifted out of its storage rack. As such, these existing systems oftentimes require manually removing the drug product vial from the needle or needles, and may lead to potential sources of contamination.

As described in more detail below, the present disclosure sets forth systems and methods for using a robotic-based reconstitution system embodying advantageous alternatives to existing systems and methods, and that may address one or more of the challenges or needs mentioned herein, as well as provide other benefits and advantages.

SUMMARY

In accordance with a first aspect, a drug reconstitution system includes a robotic arm movable between a plurality of positions, at least one bracket member operably coupled with the robotic arm, and at least one coaxial needle operably coupled with the robotic arm. The at least one bracket member includes a mounting region, a support surface, an upper surface, and a throughbore extending through the support surface and the upper surface. The at least one coaxial needle is movably disposed between the throughbore of the at least one bracket member. The at least one coaxial needle is adapted to pierce at least a portion of a vial and dispense a liquid into the vial during drug reconstitution.

In some examples, the at least one coaxial needle includes a proximal end, a distal end, an elongated length extending therebetween, a piercing tip positioned at the proximal end, a dispensing opening positioned at or near the proximal end, and a first venting hole positioned along the elongated length. The piercing tip and the dispensing opening of the at least one coaxial needle may be disposed on an inner member, and the first venting hole may be disposed on an outer member. The outer member may be at least partially hollow to receive at least a portion of the inner member. In some examples, a second venting hole may be provided that is disposed on the outer member distally from the first venting hole. The first venting hole and the second venting hole may cooperate to create a venting path to an external environment.

In some examples, the support surface of the at least one bracket member is adapted to engage a contact face of a drug vial during at least one of drug aspiration or drug reconstitution via movement of the robotic arm to a lowered position. Further, in some examples, the at least one coaxial needle may be movable relative to the at least one bracket member such that the at least one coaxial needle may be selectively raised while the support surface of the at least one bracket member remains engaged with the contact face of the drug vial. In some examples, an urging member may be provided to exert an urging force on the at least one bracket member.

In some approaches, the drug reconstitution system may include a needle assembly operably coupled with the robotic arm, the at least one bracket member, and the at least one coaxial needle. The needle assembly may include a liquid reservoir to dispense into the at least one coaxial needle.

In accordance with a second aspect, an approach for reconstituting a drug via a robotic arm movable between a plurality of positions includes operably coupling at least one bracket member with the robotic arm and operably coupling at least one coaxial needle with the robotic arm. The at least one coaxial needle is fluidly coupled with a reconstituting fluid. The robotic arm is lowered to a lowered position whereby the at least one bracket member and the at least one coaxial needle move to a lowered position adjacent to a drug vial. The approach further includes reconstituting the drug by causing the reconstituting fluid to flow through at least a portion of the at least one coaxial needle. The at least one coaxial needle is raised to a raised position while the at least one bracket member remains adjacent to the drug vial. The at least one bracket member is raised to a raised position.

In accordance with a third aspect, a system includes a drug product vial containing a drug product, a robotic arm adapted to move between a plurality of positions, at least one bracket member operably coupled with the robotic arm, and at least one coaxial needle operably coupled with the robotic arm. The drug product vial includes a seal member to retain the drug product within the drug product vial. The at least one bracket member includes a mounting region, a support surface, an upper surface, and a throughbore extending through the support surface and the upper surface. The at least one coaxial needle is at least partially disposed between the throughbore of the at least one bracket member and movable relative thereto. The at least one coaxial needle includes a first end, a second end operably coupled with the robotic arm, an outer member, an inner member at least partially disposed within the outer member, a piercing tip positioned at the first end, and at least one venting hole disposed on the outer member. Upon moving the robotic arm to a lowered position, the piercing tip of the at least one coaxial needle is adapted to pierce at least a portion of the seal member of the drug product vial and the support surface of the at least one bracket member is adapted to be positioned adjacent to the seal member of the drug product vial.

BRIEF DESCRIPTION OF THE DRAWINGS

The above needs are at least partially met through provision of the coaxial needle adapter and guide bracket for the robotic liquid handling platform described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an adapter bracket and coaxial needle are provided. The adapter bracket acts as a guide and a support for the coaxial needle, which is used to reconstitute lyophilized drug product such as, for example, a bispecific T cell engager (BiTE) in an automated workflow. The coaxial needle and adapter bracket are each mounted to a robotic arm, and more specifically, a needle assembly or liquid handling platform thereof, which in some examples may be a part of a larger automated liquid handling platform.

Turning to the figures, pursuant to these various embodiments, a drug reconstitution system 100 is provided that includes a robotic arm 102, a holder 111 that accommodates a number of drug vials 110, any number of bracket members 120, and any number of coaxial needles 130. It is appreciated that the drug reconstitution system 100 provided herein is but one example of such a system. The drug reconstitution system 100 may reconstitute, extract, and/or process a large number (e.g., approximately 60) of drug vials 110 every minute, and in some examples, can actively perform chemical analyses such as ascertaining sample protein concentrations at a similarly high rate.

The robotic arm 102 is movable between a number of positions within the confines of a three-dimensional area such as, for example, a raised position that is spatially removed from the holder 111 and/or drug vials 110, and a lowered position that is adjacent to the holder 111 and/or the drug vials 110. In some examples, a needle assembly (or liquid handling platform) 103 may be operably coupled with an end of the robotic arm 102 to reconstitute and/or otherwise prepare the drug vials 110 for use. In some examples, the needle assembly 103 may be fluidly coupled with a fluid reservoir 104 that may include a fluid such as a reconstituting fluid (e.g., a diluent) to be used during reconstitution. As a non-limiting example, any number of fluid lines 106 may extend from the fluid reservoir 104 to the needle assembly 102. The fluid reservoir 104 may include a pumping mechanism (not illustrated) to urge specific quantities of the reconstituting fluid to the needle assembly 102 as desired. The robotic arm 102 may include any number of mechanical and electromechanical components, sub-components, systems, power sources, measuring devices, processors, controllers, and the like to operate in an autonomous or semi-autonomous manner.

The drug vial 110 may be in the form of a prefilled container and includes a vial body defining an inner volume 112 and a vial seal or stopper 113. In some examples, the drug vial 110 may also include a vial adapter 114 used to releasably couple with other components (e.g., a drug delivery container, a syringe, a drug delivery device, etc.). The inner volume 112 may be sterile. In some approaches, the vial seal 113 may be in the form of a rubber stopper having a thickness of approximately 13 mm. Other examples are possible. The vial seal 113 includes a contact surface 113a positioned on an upper side thereof that, in some examples, may be exposed to an external environment 101 (i.e., an environment outside of the inner volume 112). Further, in some examples, the vial adapter 114 may also be a CSTD that mates, engages, and/or couples to other adapters such as, for example, a delivery container adapter (not illustrated).

The inner volume 112 of the drug vial 110 contains a predetermined quantity of drug product or active pharmaceutical ingredient ("API") 116 (e.g., between approximately 2 mcg and approximately 100 mcg), depending on the BiTE and vial size, which, in the illustrated example, is in powdered form (i.e., lyophilized) requiring reconstitution. In other examples, the drug product 116 may be in liquid form and may not require reconstitution. Nonetheless, the system 100 includes an accurate quantity of drug product 116, and thus does not require the need to add additional quantities thereto in a sterile environment.

In some examples, the API may be in the form of a half-life extended ("HLE") BiTE and/or an IV-admin monoclonal antibody ("mAbs") as desired. These HLE BiTEs include an antibody Fc region that advantageously provides different drug properties such as longer and extended half-lives. Accordingly, such APIs may be preferred due to their ability to maintain protective levels in the patient for relatively longer periods of time. Nonetheless, in other examples, the API may be in the form of a canonical-BiTE that is to be administered in a professional healthcare environment.

As previously noted, the fluid reservoir may contain and/or dispense a predetermined quantity of reconstituting fluid 105 or diluent (e.g., preservative-free water for injection or "WFI"; between approximately 0.5 mL and approximately 10 mL) to be added to the prefilled drug vial 110 for reconstitution of the drug product 116. In some examples, a benzyl alcohol preserved (or any other preservative) WFI may be used.

Figure 1:
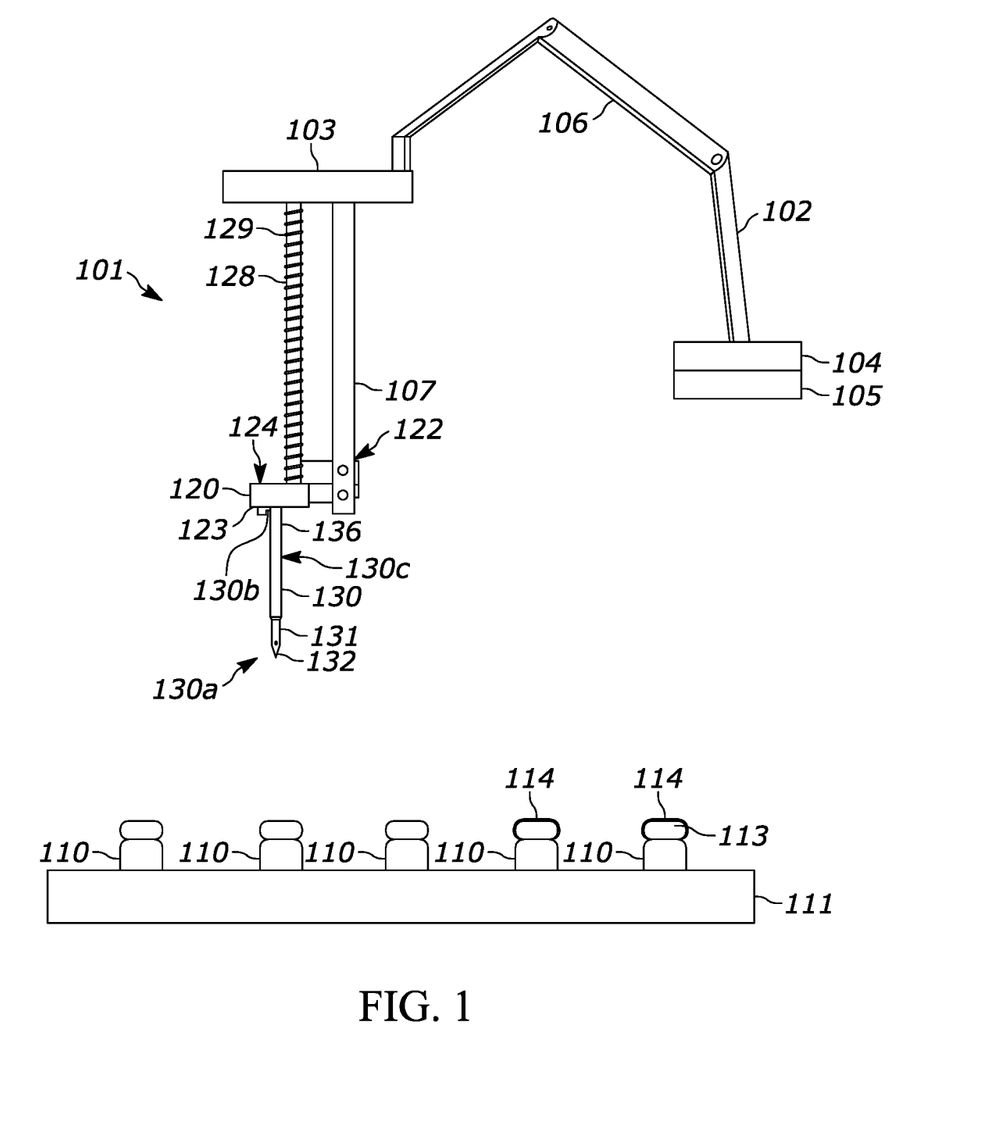
FIG. 1 illustrates a schematic of an example robotic based reconstitution system having an example coaxial needle and bracket member or adapter in accordance with various embodiments.
Figure 2:
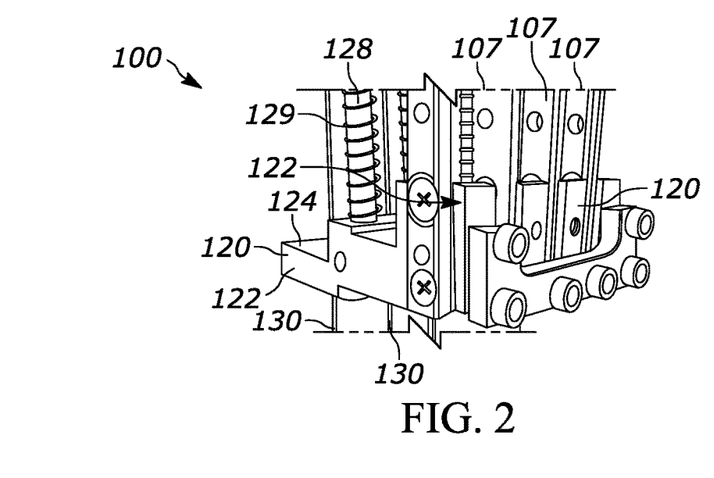
FIG. 2 illustrates a perspective view of an example needle assembly incorporating a number of coaxial needles and adapters for use with the example robotic based reconstitution system of FIG. 1 in accordance with various embodiments.
Figure 3:
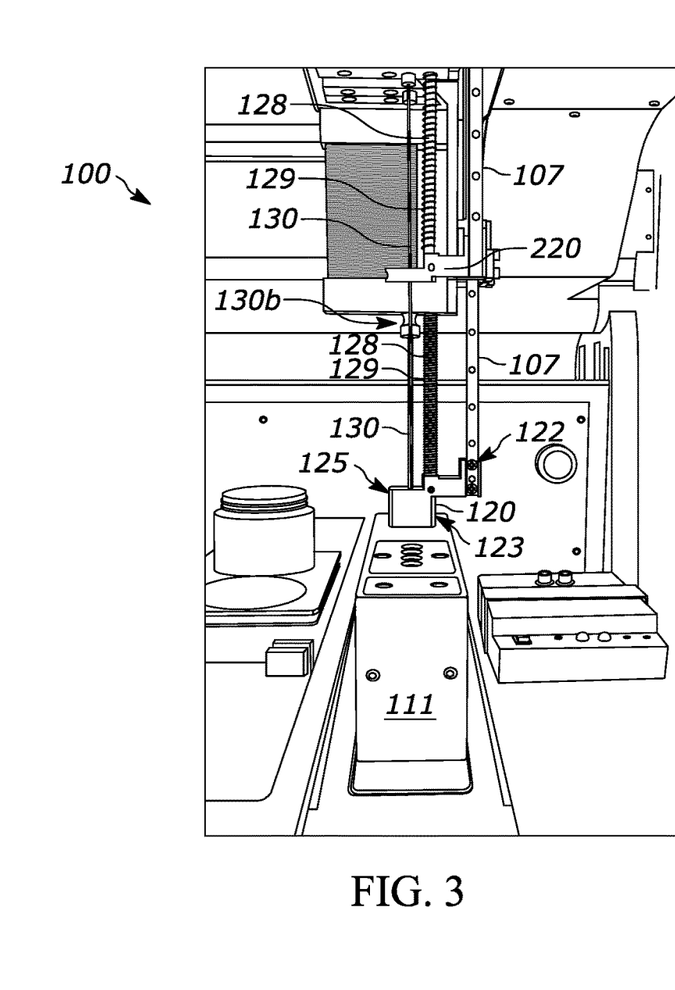
FIG. 3 illustrates an isometric view of an example robotic based reconstitution system of FIGS. 1 and 2 in accordance with various embodiments.
Figure 4:
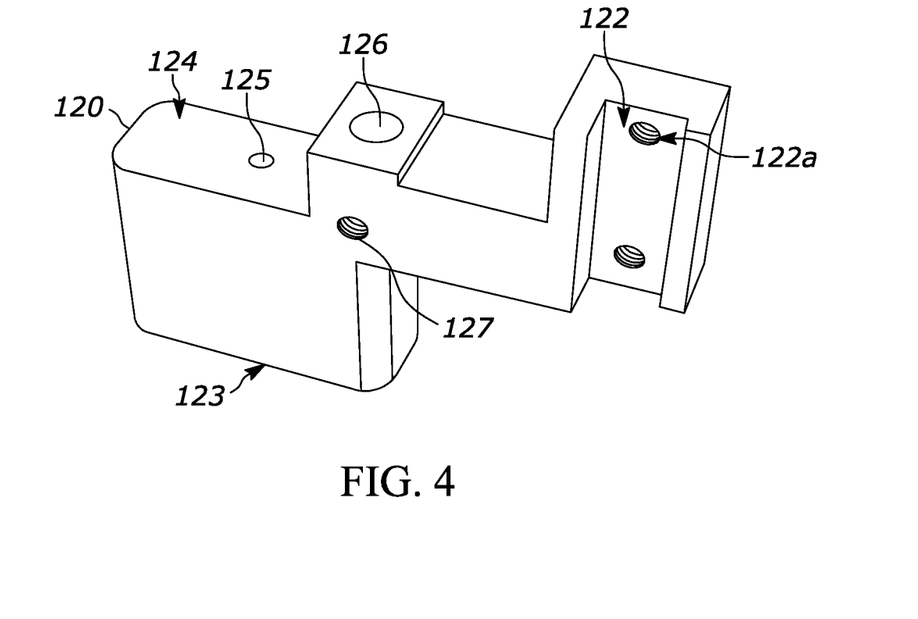
FIG. 4 illustrates an upper side perspective view of the example bracket member of FIGS. 1-3 in accordance with various embodiments.
Figure 5:
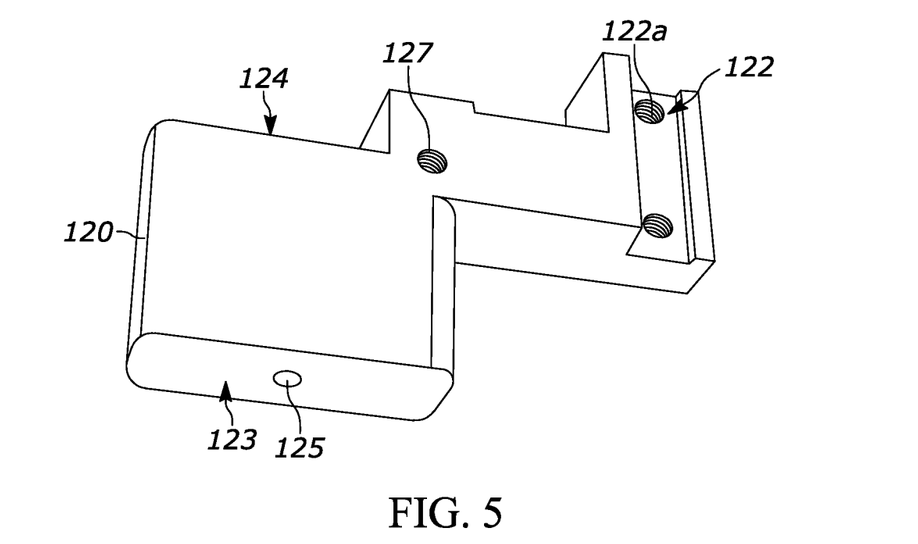
FIG. 5 illustrates a lower side perspective view of the example bracket member of FIGS. 1-4 in accordance with various embodiments.
Figure 6:
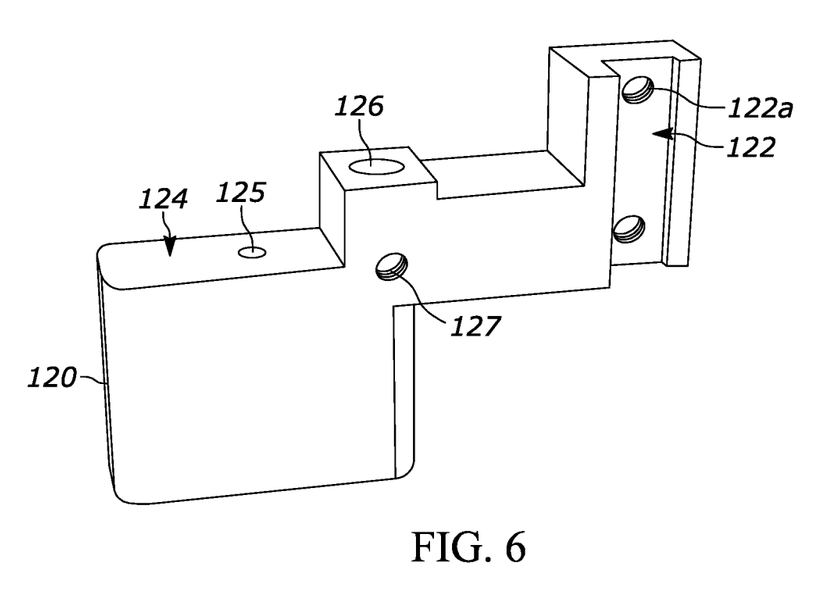
FIG. 6 illustrates a side perspective view of the example bracket member of FIGS. 1-5 in accordance with various embodiments.

The bracket member 120 is operably coupled with the robotic arm 102. More specifically, the bracket member 120 includes a mounting region 122 in the form of a recessed area having any number of mounting holes 122a. The bracket member 120 is operably coupled with the needle assembly 103 by aligning a mounting plate 107 of the needle assembly 103 with the corresponding mounting region 122 and coupling the two members together via a fastener or fasteners (see, e.g., FIG. 2). Other mounting approaches are possible such as, for example, a friction fit coupling, a snap coupling, and the like. Any number of bracket members 120 may be operably coupled with the needle assembly 103 via respective mounting plates 107.

The bracket member 120 further includes a lower or support surface 123, an upper surface 124, a throughbore 125 extending between the support surface 123 and the upper surface 124. Further, the bracket member 120 may include a rod mounting portion 126 in the form of a hole and a bore 127 to receive a set screw (not illustrated) used to retain a rod 128 (FIG. 2) therein. A resilient member 129 in the form of a spring may be coupled with and/or surround the rod 128.

Figure 7:
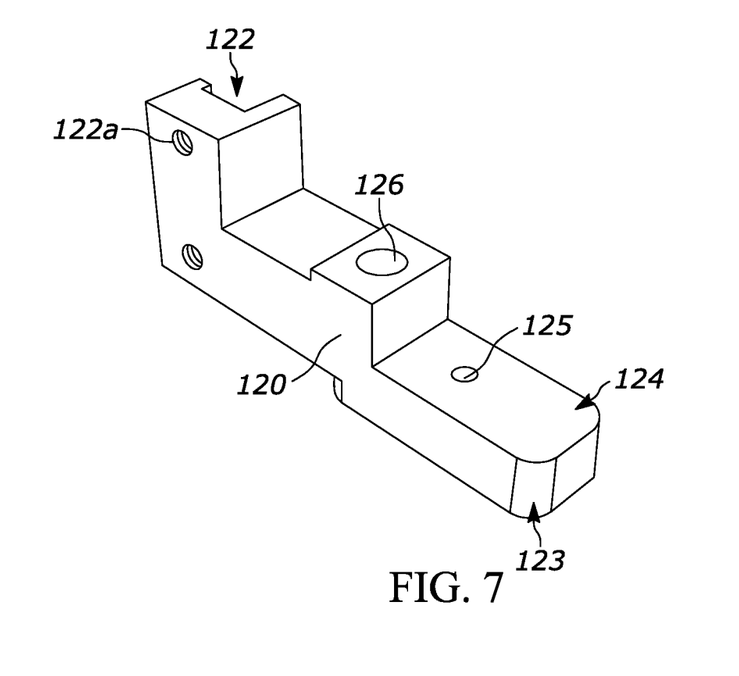
FIG. 7 illustrates an upper side perspective view of an alternative example bracket member in accordance with various embodiments.

With brief reference to FIG. 7, an alternative bracket member 220 is provided that includes similar features as the bracket member 120, but includes a relatively higher support surface 223 than the support surface 123 of the bracket member 120.

Figure 10:
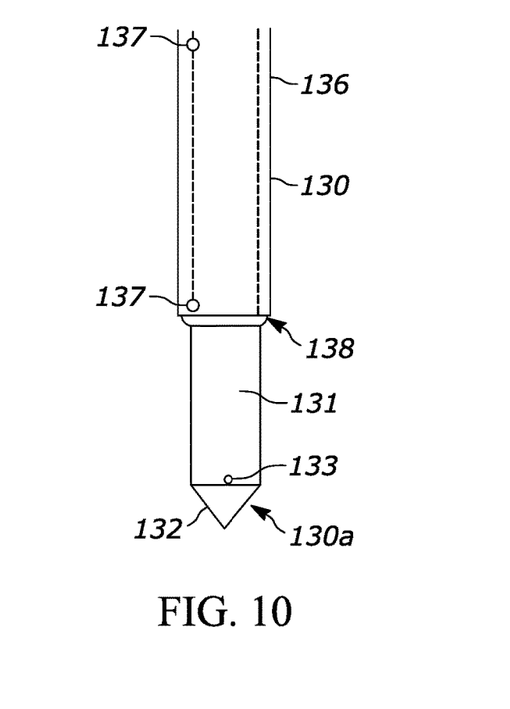
FIG. 10 illustrates a close up view of an example coaxial needle of the example robotic based reconstitution system of FIGS. 1-9 in accordance with various embodiments.
Figure 11:
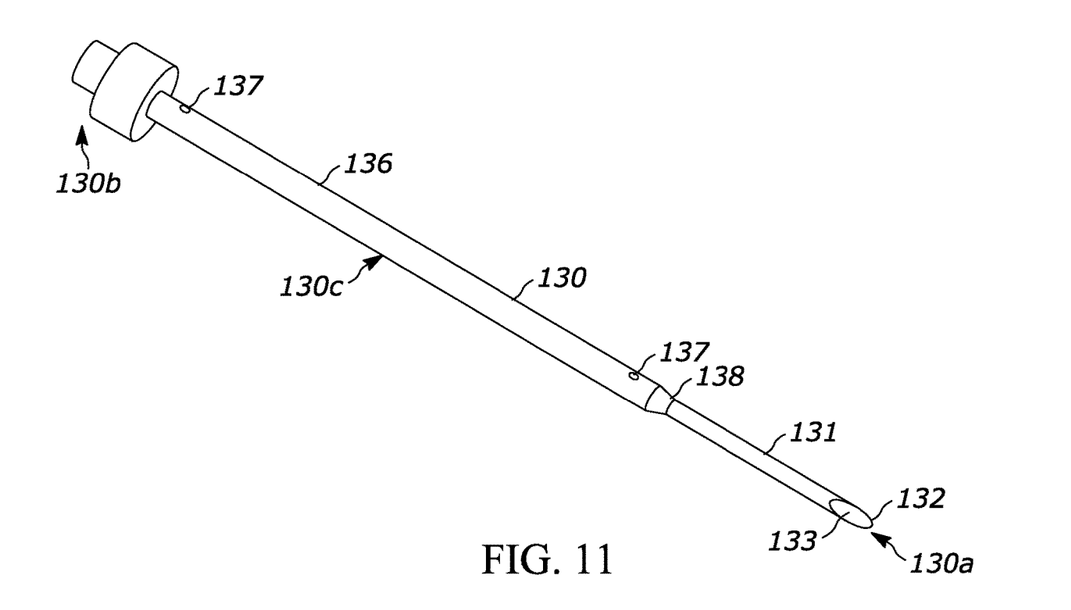
FIG. 11 illustrates a perspective view of the example coaxial needle of the example robotic based reconstitution system of FIGS. 1-10 in accordance with various embodiments.

The coaxial needle 130 includes a first or proximal end 130a, second or distal end 130b operably coupled with the robotic arm 102 (e.g., via a portion of the needle assembly 103), an elongated length 130c, an inner member 131, and an outer member or sheath 136. In some examples, the inner member 131 may be a 19 GA needle, and the outer member 136 may be 15 GA. Other examples are possible. As illustrated in FIG. 10, the outer member 136 does not extend fully to the proximal end 130a and instead terminates along a portion of the elongated length 130c. However, other arrangements are possible. Positioned at the proximal end 130a is a piercing tip 132 used to pierce at least a portion of the vial seal 113. Further, a dispensing opening 133 is also positioned at or near the proximal end 130a. The inner member 131 may be hollow and in fluid communication with the fluid reservoir 104 via the fluid line 106. More specifically, in some examples, the inner member 131 and/or the outer member 136 may be coupled with a port (not illustrated) of the needle assembly 103 via a threaded coupling to create a fluid path from the needle assembly 103 to the dispensing opening 133. In some examples, the coaxial needle 130 may include a male threaded region at the distal end 130b that insertably couples with a female threaded region on the needle assembly. Such a coupling eliminates a need for a set screw to retain the coaxial needle 130.

The outer member 136 is also at least partially hollow, and surrounds at least a portion of the inner member 131. The outer member 136 includes a number of vent holes 137 along the elongated length 130c. In some examples, the upper end of outer member 136 may be open to the external environment 101, and in other examples, the upper end of the outer member 136 may be closed and/or abut against a portion of the needle assembly 103. In the illustrated examples, a second venting hole 137 is positioned above or distal to the first venting hole 137. The second venting hole 137 may be positioned at any number of locations at or near the second end 130b of needle. The distance between the venting holes 137 may be defined relative to the dimensions of the drug vial 110 such that upon inserting the coaxial needle 130 into the inner volume 112 thereof, one venting hole 137 is positioned inside the inner volume 112 (i.e., below the vial seal 113), and one venting hole 137 is positioned outside the drug vial 110 (i.e., exposed to the external environment 101). Further, the first or lower vent hole 137 is positioned at a specified length such that it is higher than the fill level in the drug vial 110 under any circumstances (even after drug reconstitution).

The coaxial needle 130 may also include a chamfered or tapered region 138 positioned at the end of the outer member 136 to allow for a gradual transition in the varying outer diameter of the inner member 131 and the outer member 136. Such a chamfered region 138 may allow for the coaxial needle 130 to more smoothly penetrate the vial seal 113. When both the coaxial needle 130 and the bracket member 120 are coupled with the needle assembly 130, the coaxial needle 130 is disposed at least partially through the throughbore 125. As such, the throughbore 125 acts as a guide to limit movement of the coaxial needle 130. The coaxial needle 130 is movable relative to the bracket member 120. As with the bracket member 120, any number of coaxial needles 130 may be used and coupled with the robotic arm 102 to perform multiple operations concurrently.

Figure 8:
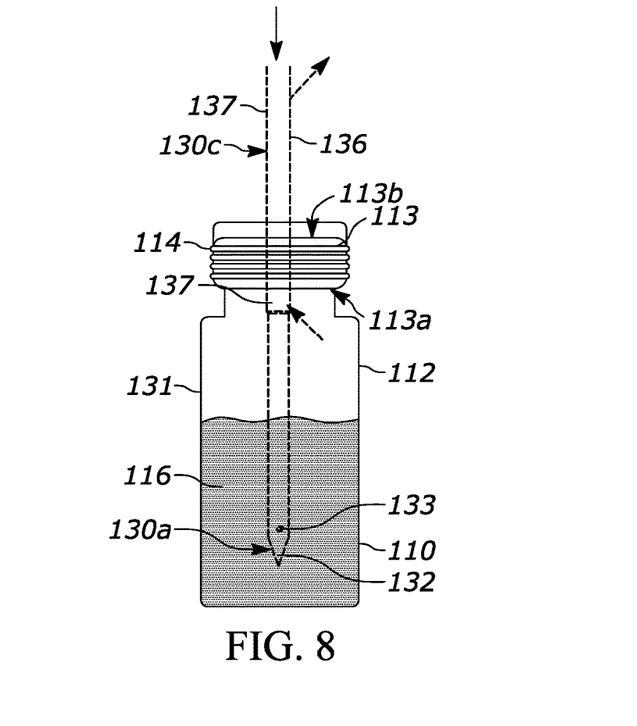
FIG. 8 illustrates a schematic view of a drug product vial and a coaxial needle assembly of the example robotic based reconstitution system of FIGS. 1-7 during reconstitution in accordance with various embodiments.
Figure 9:
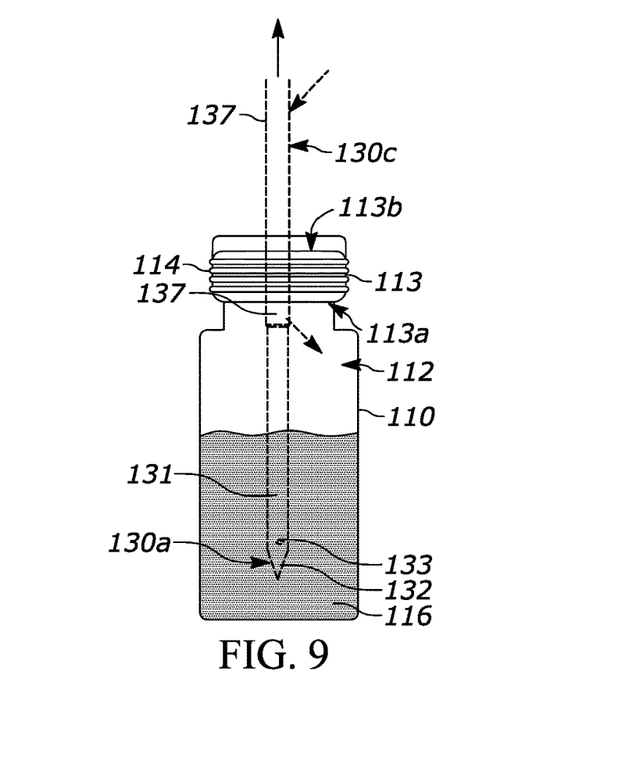
FIG. 9 illustrates a schematic view of a drug product vial and a coaxial needle assembly of the example robotic based reconstitution system of FIGS. 1-8 during aspiration in accordance with various embodiments.

To initiate drug reconstitution, the robotic arm 102 moves from an initial position in which the coaxial needle 130 is spaced away from the drug vial 110 to a raised position located axially above the drug vial 110. It is noted that in some examples, the robotic arm 102 may already be positioned above the drug vial 110 so the initial movement may not be necessary. The robotic arm 102 may lower to a lowered position which causes the piercing tip 132 of the coaxial needle 130 to pierce at least a portion of the vial seal 113. With reference to FIGS. 8 and 9, upon piercing the vial seal 113, the first end 130a of the coaxial needle 130 is positioned within the inner volume 112 of the drug vial 110. More specifically, both the dispensing opening 133 and the lower venting hole 137 are positioned within the inner volume of the drug vial 110.

The system 100 initiates drug reconstitution by adding (automatically, in some examples) a predetermined quantity of reconstituting fluid 105 from the fluid reservoir 104 through the fluid lines 106, to the needle assembly 103, through the second end 130b of the coaxial needle 130 (i.e., through the inner member 131), to the first end 130a of the coaxial needle 130 and out the dispensing opening 130. The process of reconstitution may generate a gas as the reconstituting fluid 105 is added to the drug vial 110, and as illustrated in FIG. 8, the gas may enter the lower venting hole 137, travel through the inside of the outer member 136 (while remaining separate from the fluid 105 traveling through the inner member 131), and out the second venting hole 137. Accordingly, the coaxial needle 130 may vent the pressure generated by reconstitution to reduce a risk of over pressurization.

Additionally, when the robotic arm 102 lowers, the bracket member 120 also lowers relative to the drug vial 110. The support surface 123 of the bracket member 120 may either rest on an upper surface 113b of the vial seal 113 or near (e.g., within approximately 2.0 cm) the upper surface 113b of the vial seal 113. In some examples, the resilient member 129 may urge the bracket member 120 downwardly and against the vial seal 113. As such, the bracket member 120 (i.e., the throughbore 125) not only guides movement of the coaxial needle 130, but also assists in retaining the vial 110 within the holder 111 by limiting the ability of the drug vial 110 to move axially out of the holder 111.

Upon completion of reconstitution, the robotic arm 102 may raise to a raised position relative to the drug vial 110. This movement may then cause the coaxial needle 130 to be moved upwardly from the drug vial 110. The bracket member 120 remains in the lowered position, and as such, the support surface 123 of the bracket member 120 may retain the drug vial 110 within the holder 111 to allow the coaxial needle 130 to be retracted from the vial seal 113. In some examples, the resilient member 129 may urge the bracket member 120 against the vial seal 113 to exert an opposing force on the drug vial 110 that opposes the retracting force from the coaxial needle 130 being retracted from the drug vial 110. Upon the coaxial needle 130 being removed, bracket member 120 may then be raised to allow for additional processing as needed. In some examples, the spring-loaded support rod 128 holds down the vial 110 as the robotic arm 102 retracts the coaxial needle 130 from the vial 110.

In some examples, the support surface 123 of the bracket member 120 is flush with the piercing tip 132 of the coaxial needle 130 such that when the arm 102 is fully raised, the bracket member 120 is retracted from the top of the vial 110. Notably, the drug vial 110 remains in the holder 111 during the entire reconstitution process.

In some examples (not illustrated), the robotic arm 102 may include a first movable member that causes the coaxial needle 130 to move and a second movable member that causes the bracket member 120 to move. In these examples, the first and second movable members may be separately actuatable such that the coaxial needle 130 and the bracket member 120 may move together initially to be positioned at or near the drug vial 110, and subsequently, the first movable member may be moved separately to retract the coaxial needle 130.

With reference to FIG. 9, the system 100 may also be used to aspirate or draw the drug product 116 from the drug vial 110. In this example, the needle assembly 103 may include a pumping mechanism capable of drawing the drug product 116 from the drug vial 110. To avoid a vacuum from forming within the drug vial 110, air enters the upper vent hole 137 and enters the inner volume 112 of the drug vial 110 via the lower vent hole 137.

Upon reconstituting the drug product 116, further operations may occur such as, for example, gently stirring, swirling, and/or inverting the drug vial 110, thereby forming a mixed drug product. The reconstituted drug container 110 may then be visually inspected for imperfections and/or to ensure adequate mixing has occurred. The reconstituted drug contained in the prefilled drug vial 110 may then be transferred into any number of containers (e.g., a drug delivery container (not illustrated) by mating the vial adapter 114 of the prefilled drug vial 110 to a corresponding delivery container adapter. So configured, this system may quickly perform the step of reconstitution (thus greatly reducing preparation times) and safely. The systems described herein avoid and/or eliminate the potential occurrence of needle sticking and/or spills due to over-pressurizing of the vial. Additionally, contamination is mitigated via the venting holes.

It will be appreciated that the systems and approaches described herein may be used for the storage and transport of drugs in various states, such as but not limited to drug products which have undergone completion of mixing and/or other finishing steps, drug substances which are intended to be mixed and/or finished after shipping, components or ingredients to be used in a drug, or other drug-related states or components.

The above description describes various devices, assemblies, components, subsystems and methods for use related to a drug delivery device. The devices, assemblies, components, subsystems, methods or drug delivery devices can further comprise or be used with a drug including but not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Nontherapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir. In some instances, the reservoir is a primary container that is either filled or pre-filled for treatment with the drug. The primary container can be a vial, a cartridge or a pre-filled syringe.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF), UDENYCA® (pegfilgrastim-cbqv), Ziextenzo® (LA-EP2006; pegfilgrastim-bmez), or FULPHILA (pegfilgrastim-bmez).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RANKL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 145c7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like; Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the OX40 receptor; Activase® (alteplase, tPA); Aranesp® (darbepoetin alfa) Erythropoietin [30-asparagine, 32-threonine, 87-valine, 88-asparagine, 90-threonine], Darbepoetin alfa, novel erythropoiesis stimulating protein (NESP); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-?4ß7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Kanjinti™ (trastuzumab-anns) anti-HER2 monoclonal antibody, biosimilar to Herceptin®, or another product containing trastuzumab for the treatment of breast or gastric cancers; Humatrope® (somatropin, Human Growth Hormone); Humira® (adalimumab); Vectibix® (panitumumab), Xgeva® (denosumab), Prolia® (denosumab), Immunoglobulin G2 Human Monoclonal Antibody to RANK Ligand, Enbrel® (etanercept, TNF-receptor/Fc fusion protein, TNF blocker); Nplate® (romiplostim), rilotumumab, ganitumab, conatumumab, brodalumab, insulin in solution;

Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Soliris™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); OvaRex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNF? monoclonal antibody); Reopro® (abciximab, anti-GP llb/llia receptor monoclonal antibody); Actemra® (anti-IL6 Receptor mAb); Avastin® (bevacizumab), HuMax-CD4 (zanolimumab); Mvasi™ (bevacizumab-awwb); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 145c7-CHO (anti-IL15 antibody, see U.S. Pat. No. 7,153,507); Tysabri® (natalizumab, anti-?4integrin mAb); Valortim® (MDX-1303, anti-*B. anthracis* protective antigen mAb); ABthrax™; Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2R? mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNF? mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-?5?1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFN? mAb (MEDI-545, MDX-198); anti-IGF1R mAb; anti-IGF-1R mAb (HuMax-Inflam); anti-IL12 mAb (ABT-874); anti-IL12/IL23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCG? mAb (MDX-1307); anti-mesothelin dsFv-PE38 conjugate (CAT-5001); anti-PD1mAb (MDX-1106 (ONO-4538)); anti-PDGFR? antibody (IMC-3G3); anti-TGFß mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, BPS 804 (Novartis), Evenity™ (romosozumab-aqqg), another product containing romosozumab for treatment of postmenopausal osteoporosis and/or fracture healing and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoVEXGALV/CD; OrienX010; G207, 1716; NV1020; NV12023; NV1034; and NV1042. In some embodiments, the drug delivery device may contain or be used with endogenous tissue inhibitors of metalloproteinases (TIMPs) such as but not limited to TIMP-3. In some embodiments, the drug delivery device may contain or be used with Aimovig® (erenumab-aooe), anti-human CGRP-R (calcitonin gene-related peptide type 1 receptor) or another product containing erenumab for the treatment of migraine headaches. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BiTE®) molecules such as but not limited to BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure. In some embodiments, the drug delivery device may contain or be used with Avsola™ (infliximab-axxq), anti-TNF ? monoclonal antibody, biosimilar to Remicade® (infliximab) (Janssen Biotech, Inc.) or another product containing infliximab for the treatment of autoimmune diseases. In some embodiments, the drug delivery device may contain or be used with Kyprolis® (carfilzomib), (2S)—N—((S)-1-((S)-4-methyl-1-((R)-2-methyloxiran-2-yl)-1-oxopentan-2-ylcarbamoyl)-2-phenylethyl)-2-((S)-2-(2-morpholinoacetamido)-4-phenylbutanamido)-4-methylpentanamide, or another product containing carfilzomib for the treatment of multiple myeloma. In some embodiments, the drug delivery device may contain or be used with Otezla® (apremilast), N-[2-[(1S)-1-(3-ethoxy-4-methoxyphenyl)-2-(methylsulfonyl) ethyl]-2,3-dihydro-1,3-dioxo-1H-isoindol-4-yl]acetamide, or another product containing apremilast for the treatment of various inflammatory diseases. In some embodiments, the drug delivery device may contain or be used with Parsabiv™ (etelcalcetide HCl, KAI-4169) or another product containing etelcalcetide HCl for the treatment of secondary hyperparathyroidism (sHPT) such as in patients with chronic kidney disease (KD) on hemodialysis. In some embodiments, the drug delivery device may contain or be used with ABP 798

(rituximab), a biosimilar candidate to Rituxan®/MabThera™, or another product containing an anti-CD20 monoclonal antibody. In some embodiments, the drug delivery device may contain or be used with a VEGF antagonist such as a non-antibody VEGF antagonist and/or a VEGF-Trap such as aflibercept (Ig domain 2 from VEGFR1 and Ig domain 3 from VEGFR2, fused to Fc domain of IgG1). In some embodiments, the drug delivery device may contain or be used with ABP 959 (eculizumab), a biosimilar candidate to Soliris®, or another product containing a monoclonal antibody that specifically binds to the complement protein C5. In some embodiments, the drug delivery device may contain or be used with Rozibafusp alfa (formerly AMG 570) is a novel bispecific antibody-peptide conjugate that simultaneously blocks ICOSL and BAFF activity. In some embodiments, the drug delivery device may contain or be used with Omecamtiv mecarbil, a small molecule selective cardiac myosin activator, or myotrope, which directly targets the contractile mechanisms of the heart, or another product containing a small molecule selective cardiac myosin activator. In some embodiments, the drug delivery device may contain or be used with Sotorasib (formerly known as AMG 510), a KRASG12C small molecule inhibitor, or another product containing a KRASG12C small molecule inhibitor. In some embodiments, the drug delivery device may contain or be used with Tezepelumab, a human monoclonal antibody that inhibits the action of thymic stromal lymphopoietin (TSLP), or another product containing a human monoclonal antibody that inhibits the action of TSLP. In some embodiments, the drug delivery device may contain or be used with AMG 714, a human monoclonal antibody that binds to Interleukin-15 (IL-15) or another product containing a human monoclonal antibody that binds to Interleukin-15 (IL-15). In some embodiments, the drug delivery device may contain or be used with AMG 890, a small interfering RNA (siRNA) that lowers lipoprotein(a), also known as Lp(a), or another product containing a small interfering RNA (siRNA) that lowers lipoprotein(a). In some embodiments, the drug delivery device may contain or be used with ABP 654 (human IgG1 kappa antibody), a biosimilar candidate to Stelara®, or another product that contains human IgG1 kappa antibody and/or binds to the p40 subunit of human cytokines interleukin (IL)-12 and IL-23. In some embodiments, the drug delivery device may contain or be used with Amjevita™ or Amgevita™ (formerly ABP 501) (mab anti-TNF human IgG1), a biosimilar candidate to Humira®, or another product that contains human mab anti-TNF human IgG1. In some embodiments, the drug delivery device may contain or be used with AMG 160, or another product that contains a half-life extended (HLE) anti-prostate-specific membrane antigen (PSMA)×anti-CD3 BiTE® (bispecific T cell engager) construct. In some embodiments, the drug delivery device may contain or be used with AMG 119, or another product containing a delta-like ligand 3 (DLL3) CAR T (chimeric antigen receptor T cell) cellular therapy. In some embodiments, the drug delivery device may contain or be used with AMG 119, or another product containing a delta-like ligand 3 (DLL3) CAR T (chimeric antigen receptor T cell) cellular therapy. In some embodiments, the drug delivery device may contain or be used with AMG 133, or another product containing a gastric inhibitory polypeptide receptor (GIPR) antagonist and GLP-1R agonist. In some embodiments, the drug delivery device may contain or be used with AMG 171 or another product containing a Growth Differential Factor 15 (GDF15) analog. In some embodiments, the drug delivery device may contain or be used with AMG 176 or another product containing a small molecule inhibitor of myeloid cell leukemia 1 (MCL-1). In some embodiments, the drug delivery device may contain or be used with AMG 199 or another product containing a half-life extended (HLE) bispecific T cell engager construct (BiTE®). In some embodiments, the drug delivery device may contain or be used with AMG 256 or another product containing an anti-PD-1×IL21 mutein and/or an IL-21 receptor agonist designed to selectively turn on the Interleukin 21 (IL-21) pathway in programmed cell death-1 (PD-1) positive cells. In some embodiments, the drug delivery device may contain or be used with AMG 330 or another product containing an anti-CD33×anti-CD3 BiTE® (bispecific T cell engager) construct. In some embodiments, the drug delivery device may contain or be used with AMG 404 or another product containing a human anti-programmed cell death-1 (PD-1) monoclonal antibody being investigated as a treatment for patients with solid tumors. In some embodiments, the drug delivery device may contain or be used with AMG 427 or another product containing a half-life extended (HLE) anti-fms-like tyrosine kinase 3 (FLT3)×anti-CD3 BiTE® (bispecific T cell engager) construct. In some embodiments, the drug delivery device may contain or be used with AMG 430 or another product containing an anti-Jagged-1 monoclonal antibody. In some embodiments, the drug delivery device may contain or be used with AMG 506 or another product containing a multi-specific FAP×4-1BB-targeting DARPin® biologic under investigation as a treatment for solid tumors. In some embodiments, the drug delivery device may contain or be used with AMG 509 or another product containing a bivalent T-cell engager and is designed using XmAb® 2+1 technology. In some embodiments, the drug delivery device may contain or be used with AMG 562 or another product containing a half-life extended (HLE) CD19×CD3 BiTE® (bispecific T cell engager) construct. In some embodiments, the drug delivery device may contain or be used with Efavaleukin alfa (formerly AMG 592) or another product containing an IL-2 mutein Fc fusion protein. In some embodiments, the drug delivery device may contain or be used with AMG 596 or another product containing a CD3× epidermal growth factor receptor vIII (EGFRvIII) BiTE® (bispecific T cell engager) molecule. In some embodiments, the drug delivery device may contain or be used with AMG 673 or another product containing a half-life extended (HLE) anti-CD33×anti-CD3 BiTE® (bispecific T cell engager) construct. In some embodiments, the drug delivery device may contain or be used with AMG 701 or another product containing a half-life extended (HLE) anti-B-cell maturation antigen (BCMA)×anti-CD3 BiTE® (bispecific T cell engager) construct. In some embodiments, the drug delivery device may contain or be used with AMG 757 or another product containing a half-life extended (HLE) anti-delta-like ligand 3 (DLL3)×anti-CD3 BiTE® (bispecific T cell engager) construct. In some embodiments, the drug delivery device may contain or be used with AMG 910 or another product containing a half-life extended (HLE) epithelial cell tight junction protein claudin 18.2×CD3 BiTE® (bispecific T cell engager) construct.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A drug reconstitution system comprising:
a robotic arm movable between a plurality of positions;
at least one bracket member operably coupled with the robotic arm via a mounting plate, the at least one bracket member including a mounting region, a support surface, an upper surface, and a throughbore extending through the support surface and the upper surface;
a spring-loaded support rod extending between and coupled with the robotic arm and the upper surface of the at least one bracket member, the spring-loaded support rod adapted to apply an urging force to the at least one bracket member; and
at least one coaxial needle operably coupled with the robotic arm and being movably disposed between the throughbore of the at least one bracket member, wherein upon moving the robotic arm to a lowered position, the at least one coaxial needle is adapted to pierce at least a portion of a vial and dispense a liquid into the vial during drug reconstitution and the at least one bracket member is adapted to move to a lowered position adjacent to the drug vial;
wherein in response to moving the robotic arm to a raised position, the spring-loaded support rod is adapted to cause the support surface of the at least one bracket member to remain against the drug vial.

2. The drug reconstitution system of claim 1, wherein the at least one coaxial needle includes a proximal end, a distal end, an elongated length extending therebetween, a piercing tip positioned at the proximal end, a dispensing opening positioned at or near the proximal end, and a first venting hole positioned along the elongated length.

3. The drug reconstitution system of claim 2, wherein the piercing tip and the dispensing opening of the at least one coaxial needle are disposed on an inner member and the first venting hole is disposed on an outer member, the outer member being at least partially hollow to receive at least a portion of the inner member.

4. The drug reconstitution system of claim 3, further comprising a second venting hole disposed on the outer member distally from the first venting hole, wherein the first venting hole and the second venting hole cooperate to create a venting path to an external environment.

5. The drug reconstitution system of claim 1, wherein the at least one coaxial needle is adapted to be movable relative to the at least one bracket member such that the at least one coaxial needle is selectively raised while the support surface of the at least one bracket member remains engaged with a contact face of a drug vial.

6. The drug reconstitution system of claim 1, further comprising a needle assembly operably coupled with the robotic arm, the at least one bracket member, and the at least one coaxial needle, the needle assembly including a liquid reservoir to dispense into the at least one coaxial needle.

7. A method of reconstituting a drug via a robotic arm movable between a plurality of positions, the method comprising:

operably coupling at least one bracket member with the robotic arm, the at least one bracket member including a support surface;
operably coupling at least one coaxial needle with the robotic arm, the at least one coaxial needle being fluidly coupled with a reconstituting fluid;
operably coupling a spring-loaded support rod with the robotic arm and the at least one bracket member, the spring-loaded support rod adapted to apply an urging force to the at least one bracket member;
lowering the robotic arm to a lowered position whereby the at least one bracket member and the at least one coaxial needle move to a lowered position adjacent to a drug vial such that the support surface of the at least one bracket member engages the drug vial;
reconstituting the drug by causing the reconstituting fluid to flow through at least a portion of the at least one coaxial needle;
raising the at least one coaxial needle to a raised position while the spring-loaded support rod retains the at least one bracket member in the lowered position whereby the support surface of the at least one bracket member remains against the drug vial; and
raising the at least one bracket member to a raised position.

8. The method of claim 7, wherein upon lowering the robotic arm to the lowered position, the at least one coaxial needle pierces at least a portion of a seal member of the drug vial.

9. The method of claim 7, wherein the step of reconstituting the drug comprises allowing the reconstituting fluid to flow through an inner member to a dispensing opening formed on the inner member.

10. The method of claim 7, wherein the step of raising the at least one coaxial needle further comprises urging the at least one bracket member downwardly towards the drug vial.

11. A system comprising:
a drug product vial containing a drug product, the drug product vial including a seal member to retain the drug product within the drug product vial;
a robotic arm adapted to move between a plurality of positions;
at least one bracket member operably coupled with the robotic arm via a mounting plate, the at least one bracket member including a mounting region, a support surface, an upper surface, and a throughbore extending through the support surface and the upper surface;
a spring-loaded support rod extending between and coupled with the robotic arm and the upper surface of the at least one bracket member, the spring-loaded support rod adapted to apply an urging force to the at least one bracket member; and
at least one coaxial needle operably coupled with the robotic arm and being at least partially disposed between the throughbore of the at least one bracket member and movable relative thereto, the at least one coaxial needle including a first end, a second end operably coupled with the robotic arm, an outer member, an inner member at least partially disposed within the outer member, a piercing tip positioned at the first end, and at least one venting hole disposed on the outer member;
wherein upon moving the robotic arm to a lowered position, the piercing tip of the at least one coaxial needle is adapted to pierce at least a portion of the seal member of the drug product vial and the support surface of the at least one bracket member is adapted to be positioned adjacent to the seal member of the drug product vial, and upon raising the at least one coaxial needle to a raised position, the spring-loaded support rod is adapted to retain the at least one bracket member in the lowered position whereby the support surface of the at least one bracket member remains positioned adjacent to the seal member of the drug product vial.

12. The system of claim 11, the at least one coaxial needle further comprising a dispensing opening positioned at or near the first end, wherein upon moving the robotic arm to the lowered position, a fluid flows through the dispensing opening and into the drug product vial.

13. The system of claim 11, wherein upon moving the robotic arm to the lowered position, the at least one venting hole is adapted to be positioned at a height above a height of the drug product within the drug product vial.

14. The system of claim 13, further comprising a second venting hole positioned at or near the second end of the at least one coaxial needle.

15. The system of claim 11, wherein the at least one coaxial needle is adapted to be movable relative to the at least one bracket member such that upon raising the robotic arm, the at least one coaxial needle moves to a raised position while the support surface of the at least one bracket member remains engaged with the seal member of the drug vial.

* * * * *